United States Patent [19]
Murray

[11] Patent Number: 4,809,373
[45] Date of Patent: Mar. 7, 1989

[54] BABY ROCKER

[75] Inventor: Allan B. Murray, Durban, South Africa

[73] Assignee: Lester Blou, Durban, South Africa

[21] Appl. No.: 84,886

[22] Filed: Aug. 13, 1987

[51] Int. Cl.$^4$ .............................................. A47D 9/02
[52] U.S. Cl. ........................................... 5/107; 5/109
[58] Field of Search ................... 5/101, 102, 105–109; 128/33; 297/260, 261, 272

[56] References Cited

U.S. PATENT DOCUMENTS

| | | | |
|---|---|---|---|
| 1,410,476 | 3/1922 | Keane | 5/105 X |
| 2,552,223 | 5/1951 | Seifts | 5/109 |
| 2,566,983 | 9/1951 | Caltrane | 5/109 |
| 2,608,697 | 9/1952 | Condemi | 5/109 |
| 2,793,374 | 5/1957 | Doud | 5/102 |
| 4,028,753 | 6/1977 | Rios | 5/109 X |

FOREIGN PATENT DOCUMENTS 2405674  6/1979  France .................................... 5/108

Primary Examiner—Gary L. Smith
Assistant Examiner—Michael F. Trettel
Attorney, Agent, or Firm—Bacon & Thomas

[57] ABSTRACT

A perambulator is rocked by two halves of a portable case which are hollow on one side and have surfaces configured on the other side to impart a rocking motion to the perambulator moving thereover when the halves are disposed in a flat open position. The halves are foldable together to form the portable case.

7 Claims, 2 Drawing Sheets

BABY ROCKER

INTRODUCTION TO THE INVENTION

This invention relates to a infant rocker for automatically rocking infants.

It is often necessary to rock an infant in order to calm it, and if this is to continue for some time, it can be a tedious process. A large number of automatic infant rocking devices are known, but are often complicated and comprise either large fixed devices incorporating the cot or infant's bed itself, or comprise a set of numerous different parts which require assembly or location.

OBJECT OF THE INVENTION

It is an object of this invention to provide an infant's rocking apparatus which will at least alleviate the aforementioned problems.

SUMMARY OF THE INVENTION

In accordance with this invention there is provided a rocking apparatus for an infant comprising a set of surfaces connectible together in a first orientation relative to each other to have an approximately planar base and operatively upper formations adapted to impart a rocking motion to roller members moving thereover, the roller members supporting an infant's bed, and the surfaces being adapted to be connected together in a second orientation relative to each other to form a portable case.

Preferably the surfaces are hingedly connected to fold open to the first orientation and to fold together to form the portable case in the second orientation, and further preferably there are two surfaces each forming one half of the case in the second orientation.

There is further provided a motor to be fitted underneath a surface in a position allowing it to be located within the case formed in the second orientation of the surfaces, and to be arranged to be connectible to an infant's bed on roller members on the surfaces for moving the bed over the surfaces.

Still further the surfaces are preferably inclined in one direction and the motor is adapted to draw the roller members up the surfaces and allow it to move down under the force of gravity.

The motor may be arranged to drive a crank which is securable to a drawstring having its free end securable to the axle of a set of roller members supporting an infant's bed.

There is also provided for the surfaces to have guide formations for maintaining the roller members in operative lateral positions on the surfaces, and for the connection between the two surfaces in the first orientation to be transverse to the intended direction of movement of the roller members.

BRIEF DESCRIPTION OF THE DRAWINGS

A preferred embodiment of the invention is described below by way of example only, and with reference to the accompanying drawings, in which.

DETAILED DESCRIPTION OF THE DRAWINGS

Figure 1:
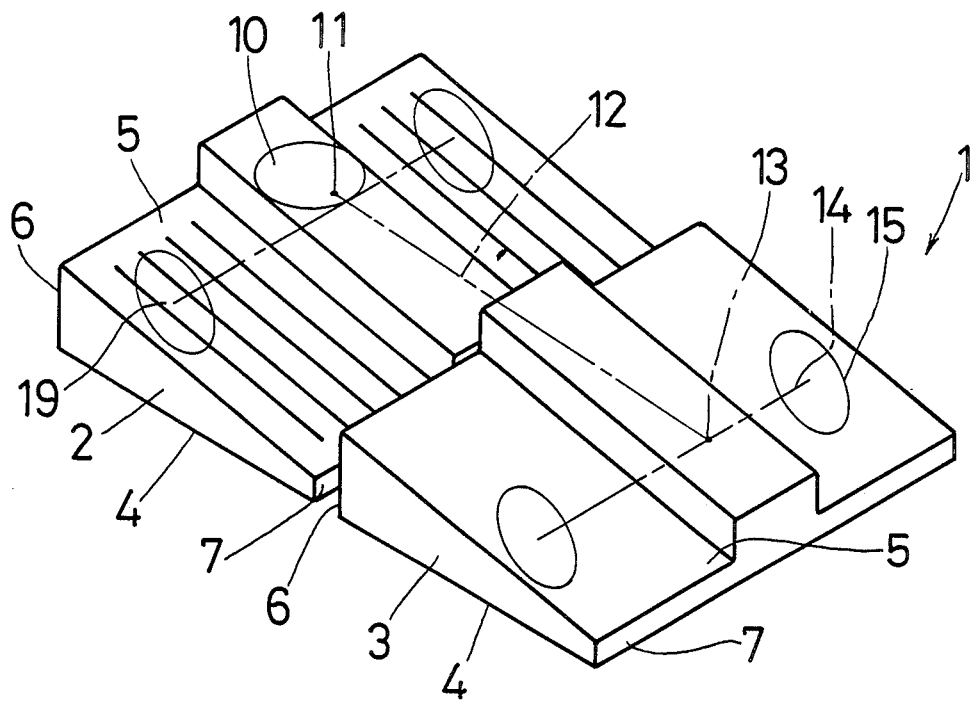
FIG. 1 is an isometric view of an unfolded set of surfaces in operative orientation in accordance with the invention.
Figure 2:
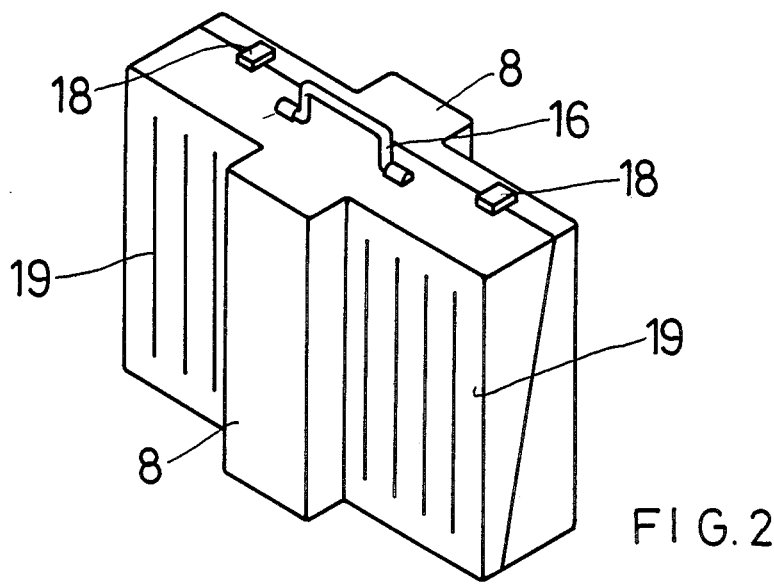
FIG. 2 is an isometric view of the surfaces of FIG. 1 in closed configuration forming a portable case; and, FIG. 3 is an isometric view of the open surfaces from the underside thereof.

Referring to the drawings, a set of surfaces (1) comprises two hollow halves (2) and (3) of a case, with the edges of the sides around the open side forming a planar base (4). The halves in operative orientation (FIG. 1) are located edge to edge with bases in the same plane resting on a floor. In this position the closed major sides of both halves form upper surfaces (5) which are inclined in the same direction as each other, having a higher edge (6) at one side of a half and a lower edge (7) at the other. The lower edge (7) of one half is secured in hinged manner to the higher edge (6) of the other half to enable the two parts to fold together to form a case with the base edges (5) of the two halves adjacent (FIG. 2).

The inclination of the upper surfaces (5) on each half to the plane of their bases (4), is the same, so that when the halves are folded closed about the hinge to form a case (FIG. 2) the operatively upper surfaces (5) of each half are in fact approximately parallel to each other.

The upper surfaces (5) have a raised central channel shape (8) running therealong in the direction of inclination and at right angles to the hinge axis. Located inside one channel shape is a motor (9) which has its shaft extending through the surface with a crank (10) mounted on it above the operative upper surface (5). The crank has a connecting lug (11) for connection to one end of a drawstring (12) which has its other end (13) secured to an axle (14) of a set of wheels (15) of a perambulator.

Figure 3:
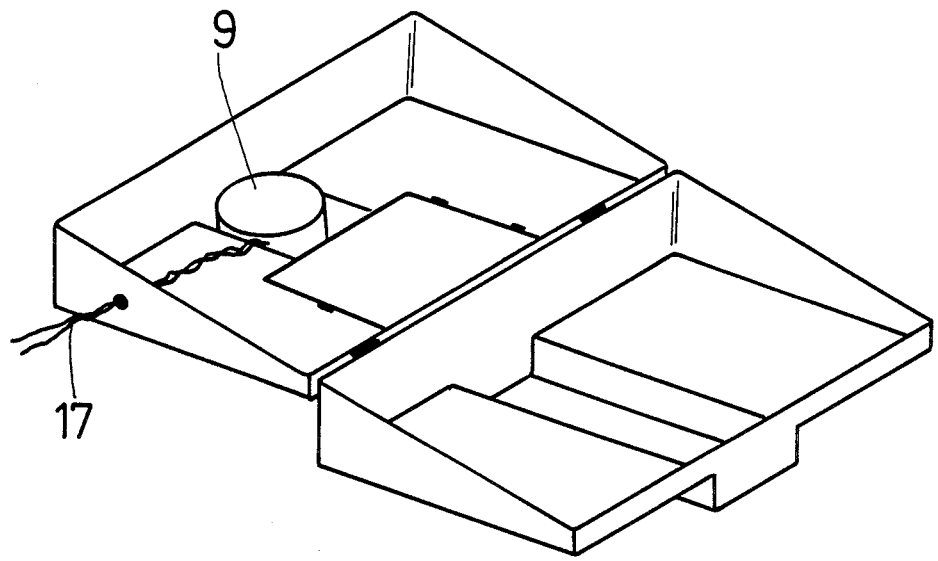

The case in closed configuration (FIG. 2) is provided with a carrying handle (16) and the electrical supply to the motor is taken out from the side of one of the parts (2), shown by numeral (17) in FIG. 3, to a conventional socket plug. Conventional over centre or other suitcase-type catches (18) are used to hold the case halves closed.

Ridges (19) are spaced apart across the surfaces in the direction of inclination, to restrain wheels (15) from wandering transversely off the surfaces.

Preferably the parts are formed by a moulding porcess and are either blow moulded or injection moulded but have a hollow interior for locating various items therein.

In use, with the surfaces open flat and a perambulator operatively located on them, the motor rotates the crank to pull the perambulator up the incline of the surfaces, and allows it to roll down in a reciprocating rocking motion.

Clearly many variations may be made to the above embodiment without departing from the scrope of the invention. For example, the shapes if the inclined surfaces may vary widely with the kind of motion desired to be imparted to the infant's bed. The motor need not only draw the bed in one direction, but may drive it in both directions against varying shapes of inclined surfaces. Further, the set of surfaces may comprise only two surfaces for one set of wheels of an infant's bed, and be foldable in a longitudinal rather than a transverse direction relative to the intended direction of movement of the infant's bed.

What is claimed is:

1. A rocking apparatus for an infant comprising a set of surfaces connected together for disposition between a first orientation in which the surfaces have an approximately planar base and are provided with upper formations shaped to impart a rocking motion to roller members moving thereover and a second orientation in which the surfaces are folded together to form a portable case, and a motor disposed below a surface in a position permitting it to be located within the case formed in the second orientation of the surfaces, the motor being connectable to an infant bed supported on roller members for moving the bed over the surfaces.

2. The apparatus of claim 1 wherein there are two surfaces, each surface forming one half of the case in the second orientation.

3. The apparatus of claim 1 wherein the surfaces further include guide formations thereon for maintaning a lateral positioning of the roller members on the surfaces.

4. A rocking apparatus for an infant comprising two surfaces connected together for disposition between a first orientation in which the surfaces have an approximately planar base and are provided with upper formations shaped to impart a rocking motion to roller members moving thereover and a second orientation in which the surfaces are folded together to form a portable case, each surface forming one-half of the case in the second orientation, and a motor disposed below a surface in a position permitting it to be located within the case formed in the second orientation of the surfaces, the motor being connectable to an infant bed supported on roller members for moving the bed over the surfaces.

5. The apparatus of claim 4 wherein the surfaces are inclined in one direction in the first orientation and the motor draws the roller members up the inclined surfaces and permits the roller members to move down the inclined surfaces under the force of gravity.

6. The apparatus of claim 5 further including a crank driven by the motor, and a drawstring having one end securable to the crank and a free end securable to an axle of the infant bed supporting the roller members.

7. A rocking apparatus for an infant comprising a set of surfaces connected together for disposition between a first orientation in which the surfaces have an approximately planar base and are provided with upper formations shaped to impart a rocking motion to roller members moving thereover and a second orientation in which the surfaces are folded together to form a portable case, and wherein the surfaces are connected for folding along adjacent edges extending transverse to the direction of movement of the roller members when the surfaces are disposed in the first orientation.

* * * * *